F. & A. L. MILLER.
KETTLE AND PAN LIFTER.
APPLICATION FILED AUG. 5, 1908.
932,306.
Patented Aug. 24, 1909.
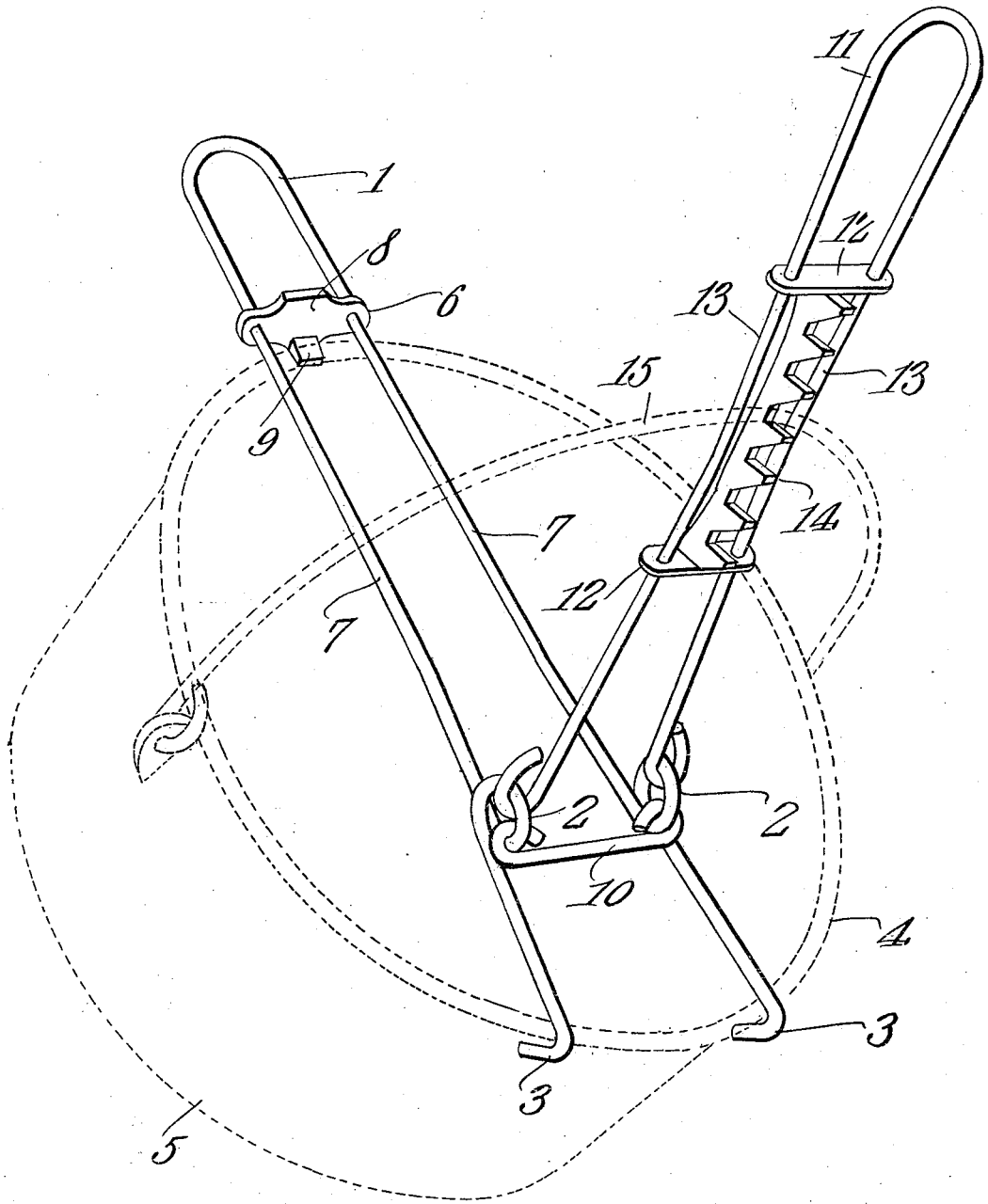
Witnesses
Inventors
Fred Miller and
Alpha L. Miller
By C. A. Snow & Co.
Attorneys

UNITED STATES PATENT OFFICE.

FRED MILLER AND ALPHA L. MILLER, OF THREE RIVERS, MICHIGAN.

KETTLE AND PAN LIFTER.

932,306.  Specification of Letters Patent.  Patented Aug. 24, 1909.

Application filed August 5, 1908. Serial No. 447,119.

*To all whom it may concern:*

Be it known that we, FRED MILLER and ALPHA L. MILLER, citizens of the United States, residing at Three Rivers, in the county of St. Joseph, State of Michigan, have invented a new and useful Kettle and Pan Lifter, of which the following is a specification.

This invention relates to kettle and pan lifters.

The objects of the invention are the provision in a merchantable form, of a device of the above-mentioned class which shall be inexpensive in construction, facile in operation and devoid of complicated parts; the provision in an improved form, of a kettle and pan lifter adapted to seize and hold firmly, vessels of various sizes, while they are being raised vertically, as from a fire, or tilted as is done when it is desired to void the contents of the vessels; the provision of a kettle and pan lifter which may be readily attached to and detached from, the vessel to be lifted.

With these and other objects in view, as will hereinafter more fully appear, the invention consists in the novel construction and arrangement of parts hereinafter described, delineated in the accompanying drawing, and particularly pointed out in the appended claim, it being understood that various changes in the form, proportions, size and minor details of the structure may be made without departing from the spirit or sacrificing any of the advantages of the invention.

The accompanying drawing shows in perspective our invention in the act of grasping and tilting a cooking pot, similar numerals of reference being employed to indicate corresponding parts.

In carrying out our invention, we provide a lower handle 1, preferably formed from the wire. The handle 1 is U shaped and near the terminals of the arms 7 of the U, is bent upon itself to form the oppositely disposed eyes 2, the terminals themselves being bent downward to form the hooks 3, adapted to engage the bead 4 of a cooking-pot 5.

Slidably mounted upon the lower handle 1 is the catch 6, frictionally held by the arms 7, which may be caused to diverge, with this holding function in view. The catch 6 comprises a plate 8, pierced to receive the arms 7 and normally disposed thereto, and a shoulder 9, projecting from the plate at substantially a right angle, the said shoulder being adapted to engage the bead 4.

Terminally attached to the eyes 2 is the brace 10, giving rigidity to the structure. Pivotally mounted in the eyes 2, is the upper handle 11, and slidably mounted upon the handle 11, are the parallel plates 12, disposed normal to the arms 13 and pierced to receive the said arms. The plates 12 carry between them, the upstanding teeth 14, integrally formed.

The arms 7 are given a slight divergence in order to hold frictionally the catch 6, and, after the hooks 3 have been placed about the bead 4, the catch 6 may, by moderated digital pressure, be slid toward the hooks 3 to bring the shoulder 9 beneath the bead 4, where it will be frictionally retained.

The arms 13 are convexed toward each other and the degree of this convexity is such as to make the sliding adjustment of the teeth 14 more difficult than the sliding adjustment of the catch 6, the multiplicity of the teeth 14 furnishing sufficient adjustment to accommodate the rise of any ordinary bail 15.

After the catch 6 has been shoved into engagement with the bead 4 as hereinbefore described, the upper handle 11 is raised, bringing the bail 15 between certain of the teeth 14, where it will be retained. The vessel may then be lifted from the fire by the handles 1 and 11, and tilted to drain the contents, as shown in the accompanying perspective.

Having thus described our invention, our claim is as follows:—

In a device of the class described, a lower handle; a resilient U-shaped upper handle comprising arms laterally convexed toward each other and pivoted terminally in the lower handle; slidably mounted upon the arms, transversely disposed plates, spaced apart and having apertures arranged to receive the arms; a serrated member uniting the plates.

In testimony that we claim the foregoing as our own, we have hereto affixed our signatures in the presence of witnesses.

FRED MILLER.
ALPHA L. MILLER.

Witnesses:
EDWARD H. ANDREWS,
GEO. B. GAYLOR,
JOHN F. STOUGH.